(12) United States Patent  
Wang

(10) Patent No.: US 11,956,346 B2  
(45) Date of Patent: Apr. 9, 2024

(54) BLOCKCHAIN SYSTEM, INFORMATION SHARING METHOD AND RELATED EQUIPMENT

(71) Applicant: SIMPLECREDIT MICRO-LENDING CO., LTD., Chongqing (CN)

(72) Inventor: Kaining Wang, Chongqing (CN)

(73) Assignee: SIMPLECREDIT MICRO-LENDING CO., LTD., Chongqing (CN)

( * ) Notice: Subject to any disclaimer, the term of this patent is extended or adjusted under 35 U.S.C. 154(b) by 851 days.

(21) Appl. No.: 16/978,709

(22) PCT Filed: Aug. 31, 2018

(86) PCT No.: PCT/CN2018/103548  
§ 371 (c)(1),  
(2) Date: Sep. 6, 2020

(87) PCT Pub. No.: WO2020/042150  
PCT Pub. Date: Mar. 5, 2020

(65) Prior Publication Data  
US 2020/0403777 A1    Dec. 24, 2020

(51) Int. Cl.  
*H04L 9/06* (2006.01)  
*H04L 67/1095* (2022.01)  
*H04L 9/00* (2022.01)

(52) U.S. Cl.  
CPC ........ *H04L 9/0637* (2013.01); *H04L 67/1095* (2013.01); *H04L 9/50* (2022.05)

(58) Field of Classification Search  
CPC .................................................... H04L 9/0637  
See application file for complete search history.

(56) References Cited

U.S. PATENT DOCUMENTS

| | | | |
|---|---|---|---|
| 10,046,228 B2* | 8/2018 | Tran .......................... A42B 3/30 |
| 10,129,034 B2* | 11/2018 | Campagna ................ H04L 9/30 |
| 10,700,852 B2* | 6/2020 | Xie ...................... G06Q 20/065 |
| 10,839,378 B1* | 11/2020 | Srinivasan ........... G06Q 20/401 |
| 11,010,478 B2* | 5/2021 | Paulraj .................. G06F 21/575 |
| 11,095,433 B2* | 8/2021 | Vouk .................... G06F 16/9024 |
| 11,146,380 B2* | 10/2021 | Wood .................. G06F 16/2379 |
| 11,159,307 B2* | 10/2021 | Bathen ................. H04L 9/3239 |
| 11,283,616 B2* | 3/2022 | Xu ............................ G06F 17/18 |
| 11,468,431 B2* | 10/2022 | Williams ................ G06Q 20/36 |
| 2016/0098723 A1* | 4/2016 | Feeney ................. G06Q 20/065 |
| | | | 705/75 |
| 2018/0062831 A1* | 3/2018 | Zhang .................... H04L 9/3236 |
| 2020/0007314 A1* | 1/2020 | Vouk ...................... H04L 63/102 |

(Continued)

*Primary Examiner* — Viral S Lakhia

(57) ABSTRACT

The present invention discloses a blockchain system comprising N local area chains and M master nodes, N is an integer greater than or equal to 2, and M is an integer greater than or equal to 1; a first local area chain includes at least one child node and a first master node, both connection between the at least one child node and connection between the at least one child node and the first master node are established, the first local area chain is any one of the N local area chains, and the first master node is one of the M master nodes; and internal shared information of the first local area chain is shared between the at least one child node, and external shared information is shared with other local area chains in the N local area chains through the first master node and other master nodes.

9 Claims, 6 Drawing Sheets

(56) References Cited

U.S. PATENT DOCUMENTS

| | | | |
|---|---|---|---|
| 2020/0159890 A1* | 5/2020 | Chui | G06F 21/128 |
| 2020/0242592 A1* | 7/2020 | Scrivner | G06Q 20/3672 |
| 2021/0067321 A1* | 3/2021 | Lu | H04L 9/0637 |
| 2021/0091957 A1* | 3/2021 | Ford | H04L 9/0855 |
| 2021/0125083 A1* | 4/2021 | Ogawa | G06N 20/00 |
| 2021/0158346 A1* | 5/2021 | Liu | G06Q 20/223 |

* cited by examiner

BLOCKCHAIN SYSTEM, INFORMATION SHARING METHOD AND RELATED EQUIPMENT

FIELD OF THE INVENTION

The present invention relates to the technical field of the Internet, in particular to a blockchain system, an information sharing method and related equipment.

BACKGROUND OF THE INVENTION

A blockchain is a novel application mode of computer technologies such as distributed data storage, point-to-point transmission, consensus mechanism and the like, and the so-called consensus mechanism is a mathematical algorithm for establishing trust and acquiring rights and interests between different nodes in a blockchain system.

Nowadays, a blockchain technology is widely used in the fields of finance, insurance, e-commerce, internet of things and the like, different blockchain networks are mostly established based on requirements of various industries and different business requirements of the industries, therefore, reliable exchange of data inside the blockchain network is realized, however, when reliable exchange of data between different blockchain networks is required to be realized, a mode of constructing a new blockchain and the like is generally adopted, the cost of enterprises is increased, when data of different blockchain networks need to be updated, the data of the various blockchain networks must be updated one by one, and thus, later-period management and maintenance burdens are aggravated.

SUMMARY OF INVENTION

The present invention provides a blockchain system, an information sharing method and related equipment, which can ensure reliable exchange of information, and favorably relieve later-period management and maintenance burdens.

In a first aspect, the present invention provides a blockchain system, comprising N local area chains and M master nodes, wherein N is an integer greater than or equal to 2, and M is an integer greater than or equal to 1;

a first local area chain includes at least one child node and a first master node, both connection between the at least one child node and connection between the at least one child node and the first master node are established, the first local area chain is any one of the N local area chains, and the first master node is one of the M master nodes; and internal shared information of the first local area chain is shared between the at least one child node, and external shared information of the first local area chain is shared with other local area chains in the N local area chains through the first master node and other master nodes in the M master nodes.

In an embodiment, when M=1, the N local area chains share the first master node, and the external shared information of the first local area chain is shared with other local area chains in the N local area chains through the first master node.

In an embodiment, when new child nodes are added into the first local area chain, the new child nodes are connected with the at least one child node and the first master node.

In an embodiment, when M is greater than or equal to 2 and M is equal to N, each of the N local area chains includes one master node, the master nodes included in the local area chains are different, and the external shared information of the first local area chain is shared with a second local area chain through the first master node and a second master node included in the second local area chain, wherein the second local area chain is any one of the N local area chains except the first local area chain, and the second master node is one of the M master nodes except the first master node.

In an embodiment, during deployment of a (N+1)th local area chain, at least two nodes are selected from nodes, which are not distributed into the N local area chains, in the blockchain system as the child nodes in the (N+1)th local area chain;

when M=1, the (N+1)th local area chain and the N local area chains share the first master node; and when M is greater than or equal 2 and M is equal to N, one node is selected from the at least two nodes as a master node in the (N+1)th local area chain.

In a second aspect, the present invention provides an information sharing method applied to a blockchain system, the blockchain system comprises N local area chains and M master nodes, wherein N is an integer greater than or equal to 2, M is an integer greater than or equal to 1, a first local area chain includes at least one child node and a first master node, both connection between the at least one child node and connection between the at least one child node and the first master node are established, the first local area chain is any one of the N local area chains, the first master node is one of the M master nodes, and the method comprises:

determining shared information of the first local area chain by the first master node, wherein the shared information comprises internal shared information and external shared information;

screening out the external shared information from the shared information by the first master node; and synchronizing the external shared information to the master nodes, except the first master node, in the M master nodes by the first master node so that the external shared information is shared with the local area chains where the master nodes, except the first master node, in the M master nodes are located in the N local area chains.

In an embodiment, the step of screening out the external shared information from the shared information by the first master node comprises:

looking up information carrying external shared labels from the shared information by the first master node; and regarding the information carrying the external shared labels as the external shared information by the first master node.

In an embodiment, when M is greater than or equal to 2 and M is equal to N, each of the N local area chains includes one master node, and the master nodes included in the local area chains are different;

the step of sending the external shared information to other local area chains in the N local area chains through other master nodes in the M master nodes by the first master node comprises:

sending the external shared information to a second local area chain through a second master node included in the second local area chain by the first master node; wherein the second local area chain is any one of the N local area chains except the first local area chain, and the second master node is one of the M master nodes except the first master node.

In a third aspect, the present invention provides an information sharing device which is applied to a blockchain system, the blockchain system comprises N local area chains and M master nodes, wherein N is an integer greater than or equal to 2, M is an integer greater than or equal to 1, a first local area chain includes at least one child node and a first master node, both connection between the at least one child node and connection between the at least one child node and the first master node are established, the first local area chain is any one of the N local area chains, the first master node is one of the M master nodes, and the device comprises:

a determining unit, used for determining shared information of the first local area chain, wherein the shared information comprises internal shared information and external shared information:

a screening unit, used for screening out the external shared information from the shared information; and a synchronizing unit, used for synchronizing the external shared information to the master nodes, except the first master node, in the M master nodes so that the external shared information is shared with the local area chains where the master nodes, except the first master node, in the M master nodes are located in the N local area chains.

In an embodiment, the screening unit is specifically used for:

looking up information carrying external shared labels from the shared information; and and regarding the information carrying the external shared labels as the external shared information.

In a fourth aspect, the present invention provides a server, the server comprises a processor and storage equipment, the processor is connected with the storage equipment, wherein the storage equipment is used for storing computer program instructions, and the processor is configured to execute the program instructions to implement the method as described in the second aspect.

In a fifth aspect, the present invention provides a computer readable storage medium, the computer readable storage medium stores a computer program, the computer program includes program instructions, and the program instructions, when executed by the processor, are used for implementing the information sharing method as described in the second aspect.

In the present invention, the blockchain system comprises the N local area chains and the M master nodes, any local area chain can be selected from the N local area chains as a first local area chain, wherein the first local area chain includes at least one child node and a first master node, both connection between the at least one child node and connection between the at least one child node and the first master node are established, therefore, the internal shared information of the first local area chain is shared between the at least one child node, the external shared information of the first local area chain is shared with other local area chains in the N local area chains through the first master node and other master nodes in the M master nodes, reliable transmission of the shared information can be ensured, and because the shared information (comprising the internal shared information and the external shared information) is directly forwarded by the blockchain system to implement exchange, later-period management and maintenance burdens are relieved favorably.

BRIEF DESCRIPTION OF THE DRAWINGS

In order to more clearly illustrate the embodiments of the present invention or the technical solutions in the prior art, the drawings required to be used in the embodiments will be briefly described below, it is obvious that the drawings in the following description are only some embodiments of the present invention, and those skilled in the art can obtain other drawings according to the drawings without creative work.

DETAILED DESCRIPTION OF ILLUSTRATED EMBODIMENTS

Figure 1:
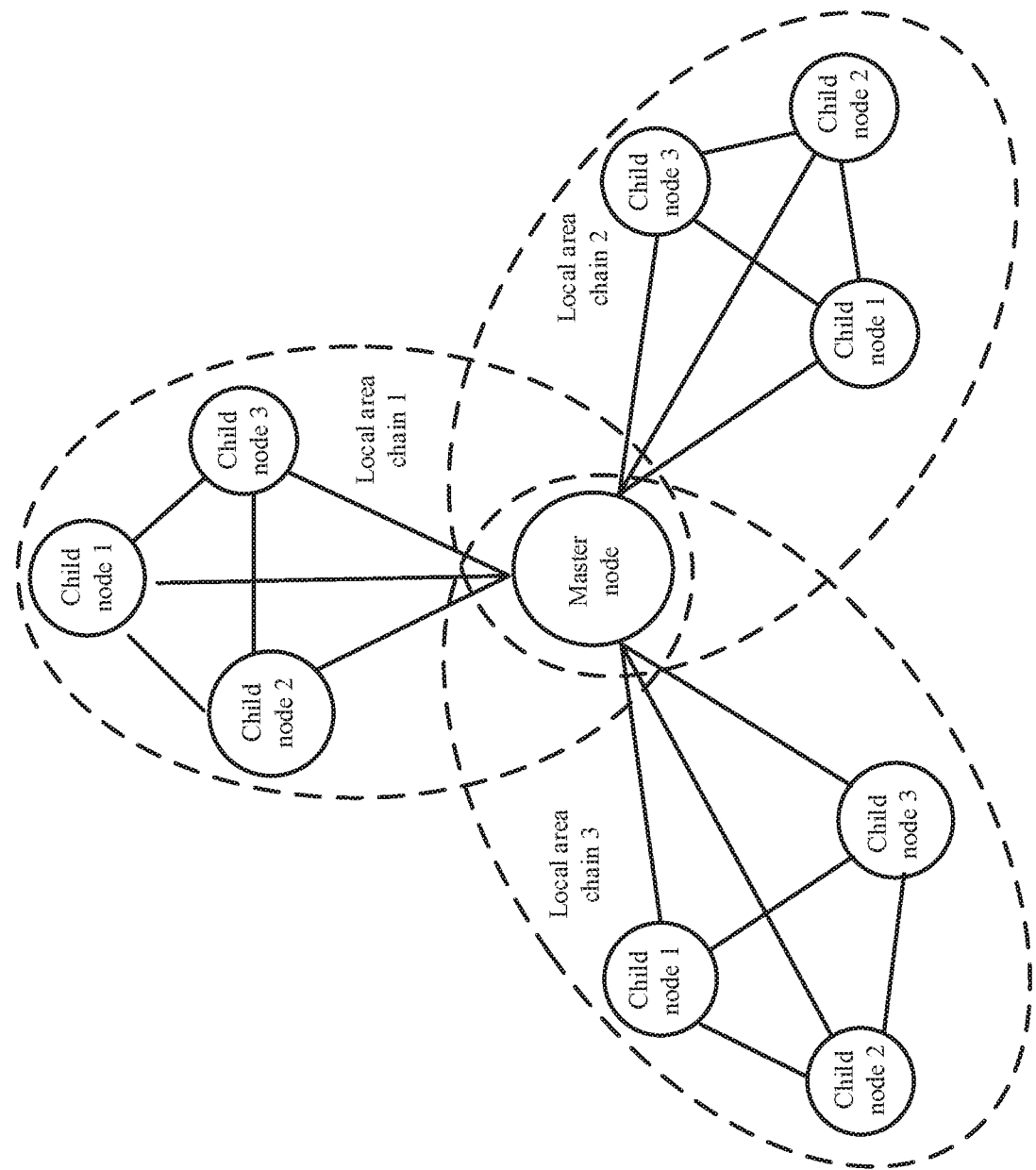
FIG. 1 is a structural schematic diagram of a blockchain network provided by an embodiment of the present invention.

The technical solutions in the embodiments of the present invention will be clearly and completely described below in conjunction with the drawings in the embodiments of the present invention, and it is obvious that the described embodiments are only a part of the embodiments of the present invention, and not all of the embodiments. All other embodiments obtained by a person skilled in the art without creative work based on the embodiments of the present invention are within the scope of protection of the present invention.

A blockchain is widely applied to the fields of finance, insurance and the like, and a plurality of projects needing to be borne by the blockchain often exist in the fields of finance, insurance and the like, so that different projects can be borne by different blockchains according to difference of the projects; on account of the commonness of the blockchain networks, data exchange can be carried out between different nodes in the same blockchain network, and data exchange cannot be carried out between nodes in different blockchain networks. Due to the fact that there are many cooperative projects in the fields of finance or insurance and the like and new cooperative projects are often added, a large number of different blockchain networks are often established based on the cooperative projects, the number of established blockchain networks is often increased along with the increase of the number of the cooperative projects, and due to the fact that enterprises need to establish a large number of blockchain networks and maintain the large number of established blockchain networks, the development and maintenance costs of the enterprises are increased, and different projects are borne based on different blockchain networks, so that data sharing cannot be automatically carried out among the different projects, and the data sharing efficiency among the projects is relatively low.

Based on this, an embodiment of the present invention provides a blockchain system, the blockchain system only comprises one blockchain, the blockchain is divided into a plurality of different local area chains, and then the different local area chains respectively bear different projects, it can be guaranteed that information is shared between the interiors of projects of the different local area chains, meanwhile, one or more nodes can be selected from nodes in the various local area chains to serve as master nodes, and the various local area chains are accessed to the master nodes, so that information sharing can be carried out among the master nodes in the different local area chains. In one embodiment, the nodes in the blockchain system are deployed on a server, and the manner can be that one node is deployed on one server, and the manner can also be that a plurality of nodes are deployed on one server. When the blockchain is divided into a plurality of different local area chains, the number of child nodes required for each local area chain needs to be determined, and after the number of child nodes required for each local area chain is determined, all the child nodes included in the blockchain are correspondingly distributed to various local area chains according to the number of child nodes required for each local area chain.

In one embodiment, the blockchain system comprises N local area chains and M master nodes, wherein N is an integer greater than or equal to 2, M is an integer greater than or equal to 1, any local area chain is selected from the blockchain system as a first local area chain, the first local area chain includes at least one child node and a first master node, wherein both connection between the at least one child node and connection between the at least one child node and the first master node are established, the first master node is one of the M master nodes, visibly, any one of the N local area chains includes at least two nodes, each local area chain includes and only includes one master node, internal shared information of the first local area chain is shared between the at least one child node, and external shared information of the first local area chain is shared with other local area chains in the N local area chains through the first master node and other master nodes in the M master nodes.

The internal shared information refers to internal information which cannot be shared by cooperative projects borne by the various local area chains (for example, the first local area chain), such as confidential business information including transaction data, the external shared information refers to data information which can be shared among different cooperative projects borne by the different local area chains, such as information including a blacklist, a whitelist and the like. In one embodiment, the M master nodes can be included in the N local area chains.

In one embodiment, when M=1, as shown in FIG. 1, the N local area chains share one master node, the master node as shown in FIG. 1 is the shared master node (namely the first master node), and the external shared information of the first local area chain is shared with other local area chains in the N local area chains through the first master node. Because the first master node is connected with the various local area chains, the first master node can receive shared information (comprising internal shared information and external shared information) of the various local area chains, after the first master node receives the shared information of the various local area chains, the external shared information which can be forwarded can be screened out, the external shared information is forwarded into other local area chains, and if the first master node receives the external shared information A of a local area chain 1, the external shared information A is forwarded to various child nodes in a local area chain 2 and a local area chain 3.

In one embodiment, after receiving the shared information, the first master node can look up information labels included in the various pieces of shared information, the information labels comprise internal information labels and external information labels, the internal information labels and the external information labels are different, the found shared information with the external information labels is the external shared information, and thus, the external shared information can be forwarded into other local area chains. In another embodiment, the first master node can further only receive the external shared information including the external information labels, and the external shared information is forwarded into other local area chains.

In one embodiment, when new child nodes are added into the first local area chain, the new child nodes are connected with the at least one child node and the first master node, for example, if the first local area chain is the local area chain 1 as shown in FIG. 1 and a new child node 4 is added into the local area chain 1, then the child node 4 is connected with a child node 1, a child node 2, a child node 3 and the master node (namely the first master node) in the local area chain, thus, the child node 4 can also share internal information with the local area chain 1, and share external information with the local area chain 2 and the local area chain 3 through the first master node.

Figure 2:
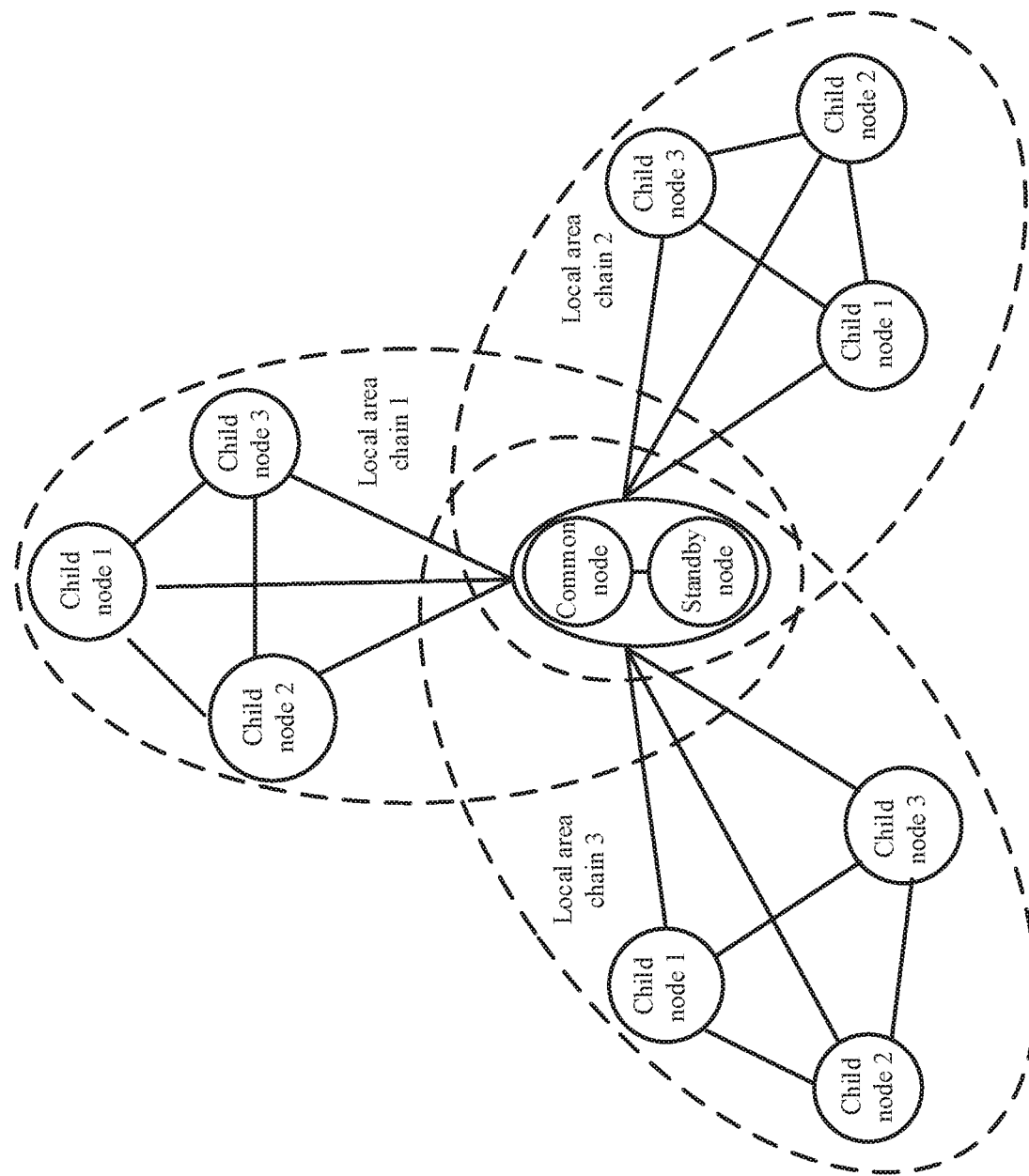
FIG. 2 is a structural schematic diagram of a blockchain network provided by another embodiment of the present invention.

It can be known from a connection relation shown in FIG. 1 that the connection relation is established between the child nodes in any local area chain, communication interruption caused by fault of a certain child node can be avoided, and in one embodiment, in order to avoid sharing interruption of external shared data caused by fault of a master node, as shown in FIG. 2, a plurality of nodes can serve as the master node (namely first master node), the first master node comprising a common node and a standby node shown in FIG. 2 is taken as an example, when the common node does not fail, the common node serves as the first master node, external shared data are forwarded and shared, and when the common node fails, the standby node serves as the first master node to forward and share the external shared data, when the common node does not fail but is low in processing efficiency, the common node and the standby node can together serve as the first master node to forward and share external data, and thus, normal running of the blockchain system can be ensured.

For example, assuming that a project borne by the local area chain 1 is a loan project A, a project borne by the local area chain 2 is a loan project B, a project borne by the local area chain 3 is a loan project C, the first master node can be a control node corresponding to a loan platform X, if a blacklist exists in the local area chain 1, the first master node can receive the blacklist shared by the local area chain 1, after it is determined that the blacklist is the external shared information, the blacklist can be forwarded to the various child nodes included in the local area chain 2 and the local area chain 3, and after the various child nodes in the local area chain 2 and the local area chain 3 receive the blacklist, if the local area chain 2 and/or the local area chain 3 receive(s) loan audit or other business audit, loan is audited or other businesses are audited based on the received blacklist shared by the first master node.

In one embodiment, when M is greater than or equal to 2 and M is equal to N, each of the N local area chains includes an independent master node, the master nodes included in the various local area chains are different, and the external shared information of the first local area chain is shared with a second local area chain through the first master node and a second master node included in the second local area chain. The second local area chain is any one of the N local area chains except the first local area chain, and the second master node is one of the M master nodes except the first master node.

It needs to be explained that in order to ensure normal work of the master nodes in the various local area chains, the master nodes in the various local area chains can also be borne by a plurality of nodes (such as the common node and the standby node) jointly, and the circumstance that since only one master node is used, information of the blockchain system cannot be transmitted normally when the master node fails is avoided.

Figure 3:
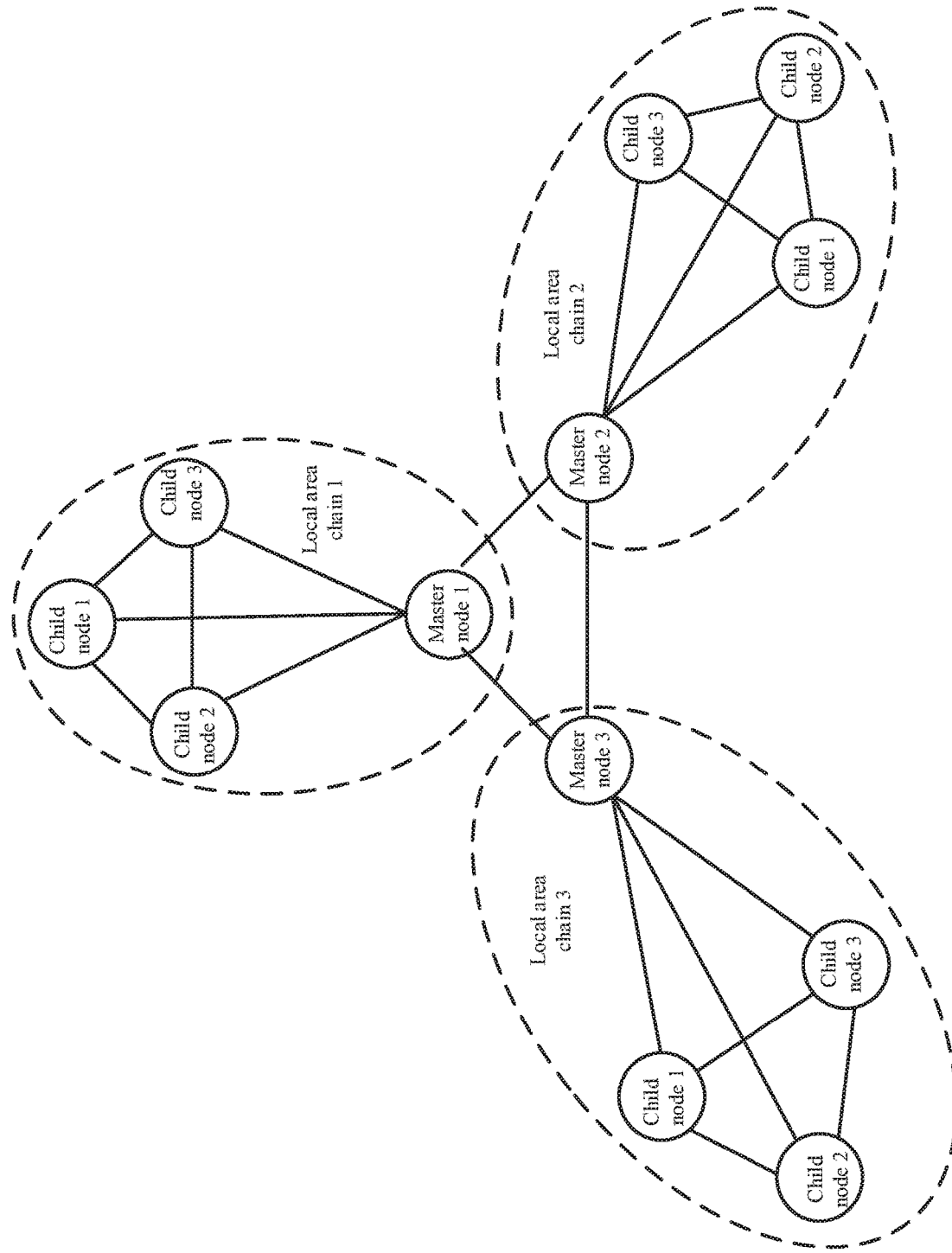
FIG. 3 is a structural schematic diagram of a blockchain network provided by another embodiment of the present invention.

For example, as shown in FIG. 3, when M=N=3, the blockchain system comprises three local area chains, wherein each local area chain includes at least one child node and one master node, assuming that three child nodes as shown in the figure are included, for example, the local area chain 1 comprises a child node 1, a child node 2, a child node 3 and a master node 1, the local area chain 2 comprises a child node 1, a child node 2, a child node 3 and a master node 2, the local area chain 3 comprises a child node 1, a child node 2, a child node 3 and a master node 3, wherein every two of the master node 1, the master node 2 and the master node 3 are different, and a connection relation can be established among the master nodes so as to facilitate information sharing.

If the local area chain 1 is a first local area chain, correspondingly, the master node 1 included in the local area chain 1 is a first master node, and when the master node 1 receives external shared data from the local area chain 1, the external shared data are forwarded to the master node 2 and the master node 3, and the master node 2 sends the external shared data to the various child nodes in the local area chain 2 to which the master node 2 belongs, and the master node 3 sends the external shared data to the various child nodes in the local area chain 3 to which the master node 3 belongs.

For example, assuming that the master node 1 (for example, the first master node) is a node server corresponding to a bank A, the master node 2 is a node server corresponding to a bank B, and the master node 3 is a node server corresponding to a bank C, various child nodes in the local area chain 1 are nodes corresponding to various cooperative enterprises having a cooperative relationship with the bank A, various child nodes in the local area chain 2 are nodes corresponding to various cooperative enterprises having a cooperative relationship with the bank B, various child nodes in the local area chain 3 are nodes corresponding to various cooperative enterprises having a cooperative relationship with the bank C, and the various child nodes in the local area chain 1, the local area chain 2 and the local area chain 3 can share internal information such as contracts, terms and transaction data in the cooperative enterprises having cooperative relations with the banks, and blacklist information belongs to external shared information which can be shared among the various local area chains. If the master node 1 receives the blacklist information sent by the local area chain 1, the blacklist information can be sent to the master node 2 and the master node 3, the master node 2 sends the blacklist information to the various child nodes in the local area chain 2, and the master node 3 sends the blacklist information to the various child nodes in the local area chain 3 to share the blacklist information in the local area chain 1.

In one embodiment, when the (N+1)th local area chain needs to be deployed, it is indicated that a new cooperative project is added, and at least two nodes are selected from the nodes, which are not distributed into the N local area chains, in the blockchain system to serve as child nodes in the (N+1)th local area chain; if M=1, the (N+1)th local area chain and the N local area chains share the first master node; and if M is greater than or equal to 2 and M is equal to N, one node is selected from the at least two nodes as a master node in the (N+)th local area chain.

Before the (N+1)th local area chain needs to be deployed, the number of child nodes needing to be deployed in the (N+1)th local area chain and the number of idle nodes in the blockchain can be determined firstly, wherein the idle nodes refer to nodes, which are not distributed into the N local area chains, in the blockchain system, and if the number of the child nodes needing to be deployed in the (N+1)th local area chain is smaller than or equal to the number of the idle nodes in the blockchain, child nodes of which the number is greater than or equal to the number of child nodes needing to be deployed in the (N+1)th local area chain are selected from the idle nodes to construct the (N+1)th local area chain.

If the number of the child nodes needing to be deployed in the (N+)th local area chain is greater than the number of the idle nodes in the blockchain, new nodes can be deployed in the blockchain system, thus, after the number of the idle nodes included in the blockchain system is greater than or equal to the number of child nodes needing to be deployed in the (N+)th local area chain, the (N+1)th local area chain is obtained to bear a newly added cooperative project, and compared with a mode of adding a new blockchain when a new cooperative project is added, the mode has the characteristic that the development and maintenance costs are greatly reduced.

After the (N+1)th local area chain is determined, the structure of the blockchain network is determined, the structure of the blockchain network comprises a structure as shown in FIG. 1 (or FIG. 2) and FIG. 3, a connection mode of master nodes in the blockchain network is determined, if the blockchain network only includes one master node, namely M=1, the structure of the blockchain network can be shown as FIG. 1, and after the child nodes in the (N+)th local area chain are connected, the child nodes in the (N+1)th local area chain are connected with the shared first master node. If the blockchain network includes more than one master node and M is equal to N, the structure of the blockchain network can be shown as FIG. 3, one node is selected from the child nodes included in the (N+1)th local area chain as a master node, the various nodes (including the master node) in the (N+1)th local area chain are connected, the master node is connected with other master nodes, in one embodiment, when the blockchain network includes more than one master node and M is equal to N, one node can also be selected from idle nodes in the blockchain network as a master node, the various child nodes in the (N+1)th local area chain are connected with the master node selected from the idle nodes, and meanwhile, the master node selected from the idle nodes is connected with other master nodes.

The external shared information in the various local area chains can be shared through the master node, therefore, when the external shared information is changed, the external shared information can be changed at any child node in a certain local area chain, information of the various child nodes in the local area chain is updated through an information sharing way in the local area chain, the updated external shared information is forwarded to the various child nodes in other local area chains through the various master nodes to update the external shared information through the whole blockchain system, visibly, while full-chain data are shared by the blockchain system, the development cost can be reduced, and subsequent management and maintenance are facilitated.

In an embodiment of the present invention, the blockchain system comprises the N local area chains and the M master nodes, any local area chain can be selected from the N local area chains as a first local area chain, wherein the first local area chain includes at least one child node and a first master node, both connection between the at least one child node and connection between the at least one child node and the first master node are established, therefore, the internal shared information of the first local area chain is shared between the at least one child node, the external shared information of the first local area chain is shared with other local area chains in the N local area chains through the first master node and other master nodes in the M master nodes, and reliable transmission of the shared information can be ensured; and because the shared information (comprising the internal shared information and the external shared information) is directly forwarded by the blockchain system to implement exchange, later-period management and maintenance burdens are relieved favorably.

Figure 4:
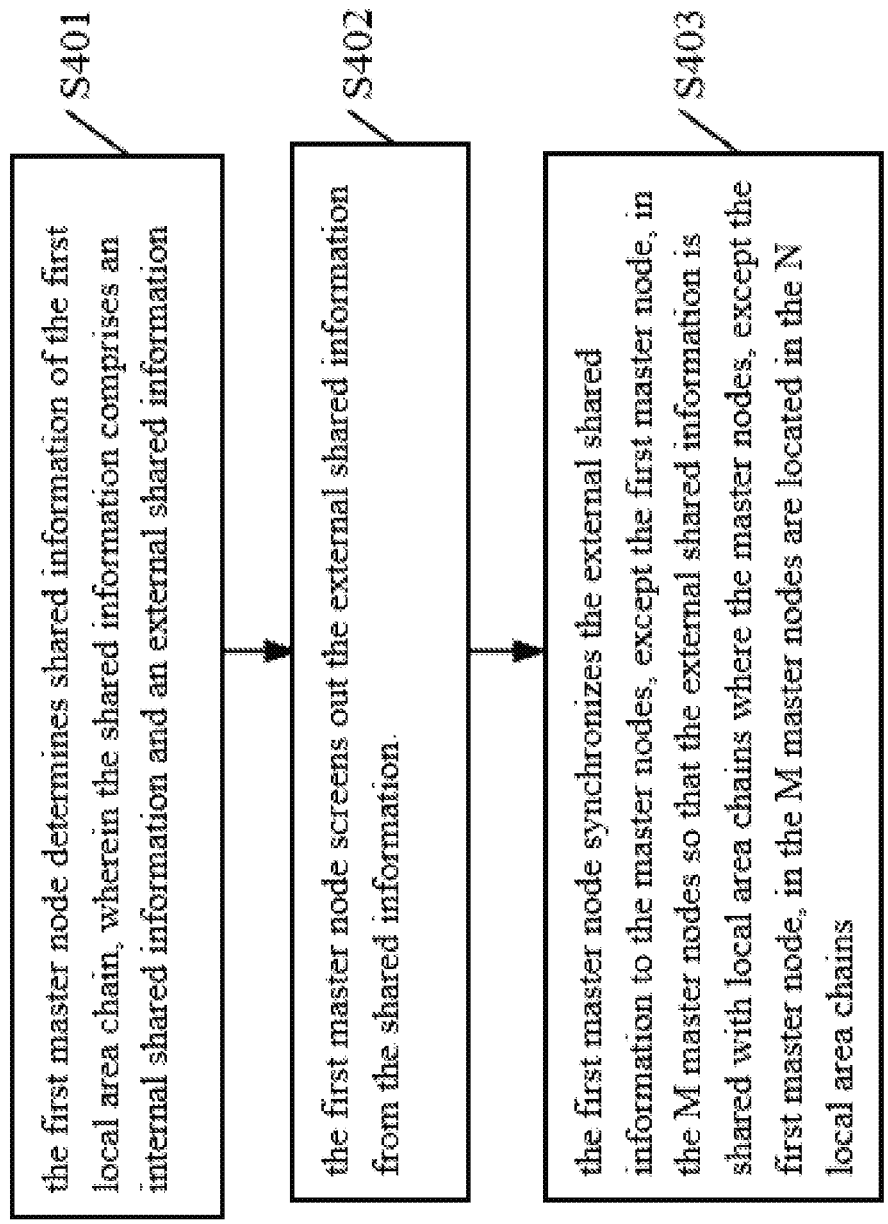
FIG. 4 is a flowchart of an information sharing method provided by an embodiment of the present invention.

FIG. 4 is a flowchart of an information sharing method provided by an embodiment of the present invention, the method can be applied to the blockchain system, the blockchain system comprises N local area chains and M master nodes, wherein N is an integer greater than or equal to 2 and M is an integer greater than or equal to 1, the first local area chain includes at least one child node and a first master node, both connection between the at least one child node and connection between the at least one child node and the first master node are established, the first local area chain is any one of the N local area chains, and the first master node is one of the M master nodes; and as shown in FIG. 4, the method comprises:

S401, the first master node determines shared information of the first local area chain, wherein the shared information comprises internal shared information and external shared information.

S402, the first master node screens out the external shared information from the shared information.

S403, the first master node synchronizes the external shared information to the master nodes, except the first master node, in the M master nodes so that the external shared information is shared with the local chains where the master nodes, except the first master node, in the M master nodes are located in the N local area chains.

In step S401 to step S403, the step that the first master node determines the external shared information from the shared information specifically comprises:

s11, the first master node looks up information carrying external shared labels from the shared information; and s12, the first master node regards the information carrying the external shared labels as the external shared information.

In one embodiment, when M is greater than or equal to 2 and M is equal to N, each of the N local area chains includes one master node, the master nodes in the local area chains are different, when the first master node sends the external shared information to other local area chains in the N local area chains through other master nodes in the M master nodes, the following process is specifically executed: the first master node sends the external shared data to a second local area chain through a second master node included in the second local area chain, wherein the second local area chain is any one of the N local area chains except the first local area chain, and the second master node is one of the M master nodes except the first master node.

In an embodiment of the present invention, the first master node can determine shared information (comprising internal shared information and external shared information) of at least one child node, the external shared information is screened out from the shared information so that the first master node can synchronize the external shared information to the local area chains where the master nodes, except the first master node, in the M master nodes are located in the N local area chains through the master nodes, except the first master node, in the M master nodes, the shared information is directly forwarded by the blockchain system to implement sharing, and therefore, later-period management and maintenance burdens are relieved favorably while the accuracy of data sharing is ensured.

An embodiment of the present invention further provides an information sharing device, the device is a unit for executing any one of the foregoing methods and runs in the blockchain system, the blockchain system comprises N local area chains and M master nodes, wherein N is an integer greater than or equal to 2, M is an integer greater than or equal to 1, the first local area chain includes at least one child node and a first master node, both connection between the at least one child node and connection between the at least one child node and the first master node are established, the first local area chain is any one of the N local area chains, and the first master node is one of the M master nodes.

Figure 5:
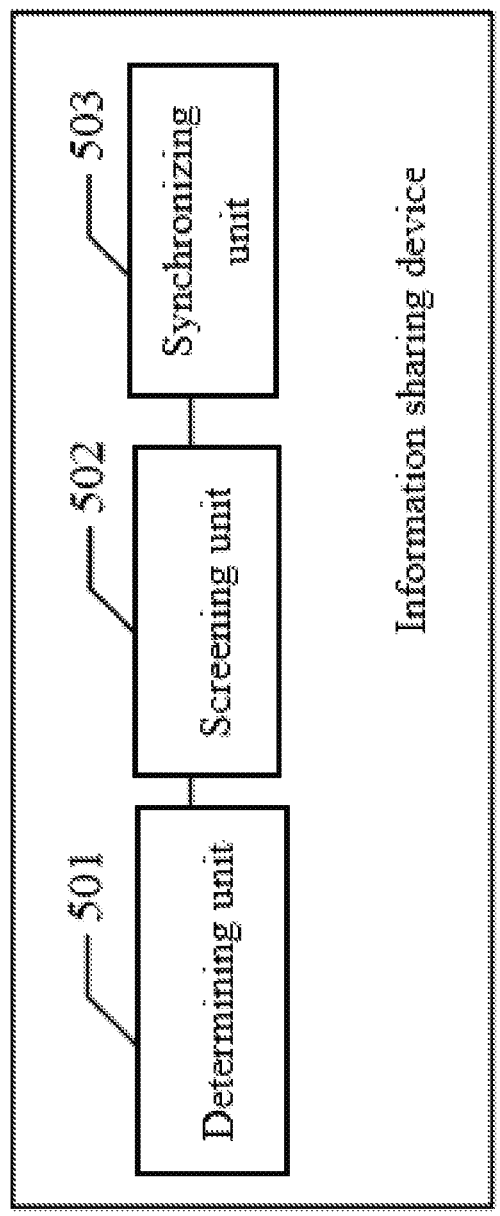
FIG. 5 is a structural schematic block diagram of an information sharing device provided by an embodiment of the present invention.

Specifically, refer to FIG. 5 which is a schematic block diagram of an information sharing device provided by an embodiment of the present invention. The device of the embodiment comprises a determining unit 501, a screening unit 502 and a synchronizing unit 503.

The determining unit 501 is used for determining shared information of the first local area chain, wherein the shared information comprises internal shared information and external shared information;

the screening unit 502 is used for screening out the external shared information from the shared information; and the synchronizing unit 503 is used for synchronizing the external shared information to the master nodes, except the first master node, in the M master nodes so that the external shared information is shared with the local area chains where the master nodes, except the first master node, in the M master nodes are located in the N local area chains.

In one embodiment, the screening unit 502 is specifically used for:

looking up information carrying external shared labels from the shared information; and regarding the information carrying the external shared labels as external shared information.

In an embodiment of the present invention, the determining unit 501 can determine shared information (comprising internal shared information and external shared information) of at least one child node, the screening unit 502 screens out the external shared information from the shared information so that the synchronizing unit 503 can synchronize the external shared information to the local area chains where the master nodes, except the first master node, in the M master nodes are located in the N local area chains through the master nodes, except the first master node, in the M master nodes, the shared information is directly forwarded by the blockchain system to implement sharing, and therefore, later-period management and maintenance burdens are relieved favorably while the accuracy of data sharing is ensured.

Figure 6:
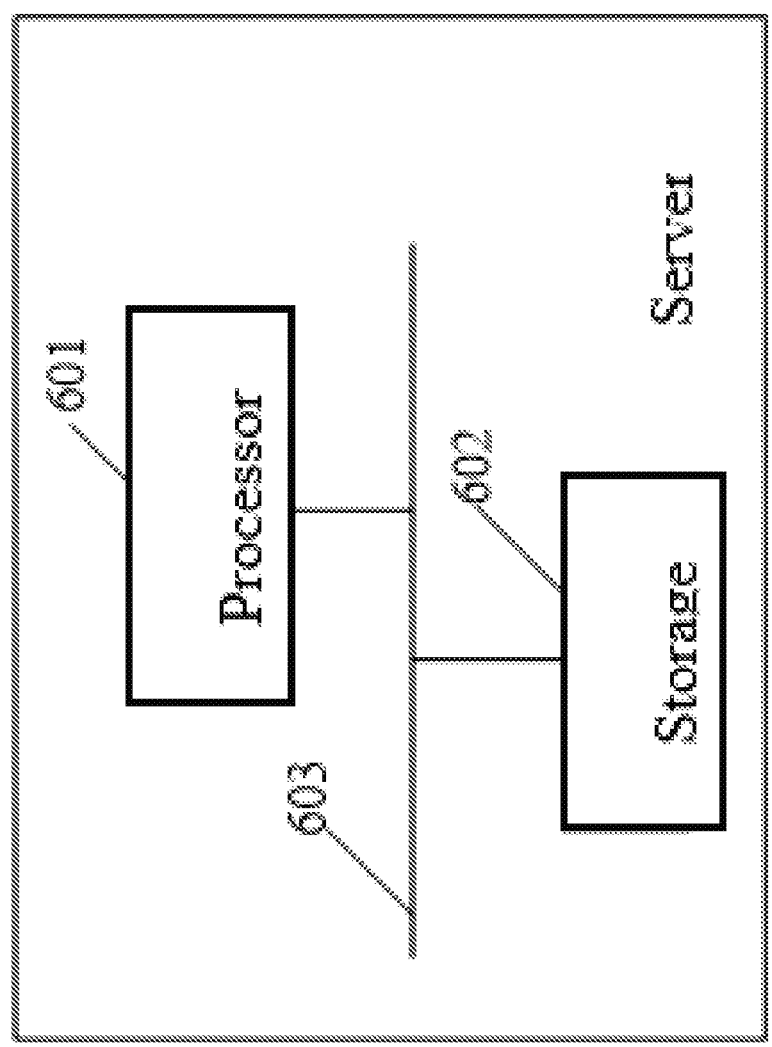
FIG. 6 is a structural schematic block diagram of a server provided by an embodiment of the present invention.

FIG. 6 is a structural schematic block diagram of a server provided by an embodiment of the present invention. The server in the embodiment as shown in the figure can comprise structures including a power supply, a shell and various required interfaces such as a network interface and a user interface. The server further comprises one or more processors 601 and a storage device 602. The processor 601 is connected with the storage device 602, and in one embodiment, the processor 601 can be connected with the storage device 602 through a bus 603.

The server runs on the blockchain system, the blockchain system comprises N local area chains and M master nodes, wherein N is an integer greater than or equal to 2, M is an integer greater than or equal to 1, a first local area chain includes at least one child node and a first master node, both connection between the at least one child node and connection between the at least one child node and the first master node are established, the first local area chain can be any one of the N local area chains, and the first master node is one of the M master nodes.

The server can comprise a user interface, the user interface can comprise an interface module composed of some physical keys or touch keys and the like, and can receive a user's operation, and the user interface can further comprise some structures capable of prompting information including the working state of the server and the like to the user, such as a display screen.

The storage device 602 can comprise a volatile memory such as a random-access memory (RAM); the storage device 602 can also comprise a non-volatile memory such as a flash memory and a solid-state drive (SSD); and the storage device 602 can further comprise a combination of the foregoing memories.

The processor 601 can be a central processing unit (CPU). The processor 601 can further comprise a hardware chip. The hardware chip can be an application-specific integrated circuit (ASIC), a programmable logic device (PLD) and the like. The PLD can be a field-programmable gate array (FPGA), generic array logic (GAL) and the like. The processor 601 can also be a combination of the structures.

In an embodiment of the present invention, the storage device 602 is used for storing a computer program, the computer program includes program instructions, and the processor 601 is used for executing the program instructions stored in the storage device 602 to implement the corresponding method steps in the embodiments.

In one embodiment, the processor 601 is configured to call the program instructions to:

acquire shared information of at least one child node, wherein the shared information comprises internal shared information and external shared information;

determine the external shared information from the shared information; and send the external shared information to other local area chains in the N local area chains through other master nodes in the M master nodes.

In one embodiment, the processor 601 is further configured to call the program instructions to:

look up information carrying external shared labels from the shared information; and regard the information carrying the external shared labels as external shared information.

It will be understood by those skilled in the art that all or part of the processes of the methods of the embodiments described above can be implemented by a computer program which instructions related hardware, the program can be stored in a computer readable storage medium, when executed, the program can comprise the processes of the embodiments of the methods described above. The storage medium can be a magnetic disk, an optical disk, a read-only memory (ROM) or a random access memory (RAM) and the like.

The foregoing disclosure has been made only in part of the embodiments of the present invention and, of course, is not intended to limit claims of the present invention, and those skilled in the art would understand that all or part of the processes for implementing the embodiments described above and equivalent changes made in accordance with the claims of the present invention remain within the scope encompassed by the present invention.

The invention claimed is:

1. A blockchain system with memory or hardware processor, characterized by comprising N local area chains and M master nodes, wherein N is an integer greater than or equal to 2, and M is an integer greater than or equal to 1;

a first local area chain includes at least one child node and a first master node, both connection between the at least one child node and connection between the at least one child node and the first master node are established, the first local area chain is any one of the N local area chains, and the first master node is one of the M master nodes;

an internal shared information of the first local area chain is shared between the at least one child node, and an external shared information of the first local area chain is shared with other local area chains in the N local area chains through the first master node and other master nodes in the M master nodes; and when M is greater than or equal to 2 and M is equal to N, each of the N local area chains includes one master node, the master nodes included in the local area chains are different, and the external shared information of the first local area chain is shared with a second local area chain through the first master node and a second master node included in the second local area chain, wherein the second local area chain is any one of the N local area chains except the first local area chain, and the second master node is one of the M master nodes except the first master node.

2. The system with memory or hardware processor according to claim 1, characterized in that when M=1, the N local area chains share the first master node, and the external shared information of the first local area chain is shared with other local area chains in the N local area chains through the first master node.

3. The system with memory or hardware processor according to claim 2, characterized in that when new child nodes are added into the first local area chain, the new child nodes are connected with the at least one child node and the first master node.

4. The system with memory or hardware processor according to claim 1, characterized in that, during deployment of a $(N+1)^{th}$ local area chain, at least two nodes are selected from nodes, which are not distributed into the N local area chains, in the blockchain system as child nodes in the (N+1)th local area chain;

when M=1, the $(N+1)^{th}$ local area chain and the N local area chains share the first master node; and when M is greater than or equal to 2 and M is equal to N, one node is selected from the at least two nodes as a master node in the $(N+1)^{th}$ local area chain.

5. An information sharing method, applied to a blockchain system, wherein the blockchain system comprises N local area chains and M master nodes, N is an integer greater than or equal to 2, M is an integer greater than or equal to 1, a first local area chain includes at least one child node and a first master node, both connection between the at least one child node and connection between the at least one child node and the first master node are established, the first local area chain is any one of the N local area chains, the first master node is one of the M master nodes, and the method comprises:

determining a shared information of the first local area chain by the first master node, wherein the shared information comprises an internal shared information and an external shared information;

screening out the external shared information from the shared information by the first master node; and synchronizing the external shared information to the master nodes, except the first master node, in the M master nodes by the first master node so that the external shared information is shared with the local area chains where the master nodes, except the first master node, in the M master nodes are located in the N local area chains.

6. The method according to claim 5, characterized in that the step of screening out the external shared information from the shared information by the first master node comprises:

looking up an information carrying an external shared label from the shared information by the first master node; and regarding the information carrying the external shared label as the external shared information by the first master node.

7. An information sharing device, applied to a blockchain system with memory or hardware processor, wherein the blockchain system with memory or hardware processor comprises N local area chains and M master nodes, N is an integer greater than or equal to 2, M is an integer greater than or equal to 1, a first local area chain includes at least one child node and a first master node, both connection between the at least one child node and connection between the at least one child node and the first master node are established, the first local area chain is any one of the N local area chains, the first master node is one of the M master nodes, and the device comprises:

a determining unit, used for determining a shared information of the first local area chain, wherein the shared information comprises an internal shared information and an external shared information;

a screening unit, used for screening out the external shared information from the shared information; and a synchronizing unit, used for synchronizing the external shared information to the master nodes, except the first master node, in the M master nodes so that the external shared information is shared with the local area chains where the master nodes, except the first master node, in the M master nodes are located in the N local area chains.

8. A non-transitory computer readable storage medium, applied to a blockchain system with memory or hardware processor, characterized in that the non-transitory computer readable storage medium stores a computer program, the computer program includes program instructions, and when executed by a processor, the program instructions enable the processor to execute the following operation:

determining a shared information of a first local area chain, wherein the shared information comprises an internal shared information and an external shared information;

screening out the external shared information from the shared information; and synchronizing the external shared information to master nodes, except a first master node, in M master nodes, so that the external shared information is shared with local area chains where the master nodes, except the first master node, in the M master nodes are located in N local area chains, wherein the blockchain system with memory or hardware processor comprises N local area chains and M master nodes, N is an integer greater than or equal to 2, M is an integer greater than or equal to 1, the first local area chain includes at least one child node and the first master node, both connection between the at least one child node and connection between the at least one child node and the first master node are established, the first local area chain is any one of the N local area chains, the first master node is one of the M master node;

an internal shared information of the first local area chain is shared between the at least one child node, and an external shared information of the first local area chain is shared with other local area chains in the N local area chains through the first master node and other master nodes in the M master nodes;

when M is greater than or equal to 2 and M is equal to N, each of the N local area chains includes one master node, the master nodes included in the local area chains are different, and the external shared information of the first local area chain is shared with a second local area chain through the first master node and a second master node included in the second local area chain, wherein the second local area chain is any one of the N local area chains except the first local area chain, and the second master node is one of the M master nodes except the first master node.

9. The non-transitory computer readable storage medium according to claim 8, characterized in that the operation of screening out the external shared information from the shared information by the processor comprises:

looking up an information carrying an external shared label from the shared information; and regarding the information carrying the external shared label as the external shared information.

* * * * *